(12) United States Patent
Zambonin et al.

(10) Patent No.: US 7,900,653 B2
(45) Date of Patent: Mar. 8, 2011

(54) TWO-WAY BALL VALVE TO PREVENT BACKWASH

(75) Inventors: Urs Zambonin, Uerikon (CH); Reto Hobi, St. Gallenkappel (CH)

(73) Assignee: Belimo Holding AG, Hinwil (CH)

( * ) Notice: Subject to any disclaimer, the term of this patent is extended or adjusted under 35 U.S.C. 154(b) by 499 days.

(21) Appl. No.: 12/066,798

(22) PCT Filed: Sep. 1, 2006

(86) PCT No.: PCT/CH2006/000473

§ 371 (c)(1),
(2), (4) Date: Mar. 13, 2008

(87) PCT Pub. No.: WO2007/030960

PCT Pub. Date: Mar. 22, 2007

(65) Prior Publication Data

US 2008/0283787 A1    Nov. 20, 2008

(30) Foreign Application Priority Data

Sep. 14, 2005   (CH) ................................. 1493/05

(51) Int. Cl.
*F16K 5/06*   (2006.01)
(52) U.S. Cl. .................. 138/44; 251/315.1; 251/317
(58) Field of Classification Search .................. 251/314, 251/316, 317, 315.01, 315.1, 315.14; 138/44, 138/45
See application file for complete search history.

(56) References Cited

U.S. PATENT DOCUMENTS

| | | | | |
|---|---|---|---|---|
| 2,885,179 A | * | 5/1959 | Hartmann | 251/315.08 |
| 3,347,517 A | * | 10/1967 | Scaramucci | 251/315.14 |
| 3,760,836 A | * | 9/1973 | Albanese | 137/360 |
| 4,108,196 A | * | 8/1978 | Calvert et al. | 137/72 |
| 4,262,688 A | * | 4/1981 | Bialkowski | 137/242 |
| 4,553,562 A | * | 11/1985 | Nakada | 137/375 |
| 4,658,978 A | * | 4/1987 | Ikematsu et al. | 251/315.12 |
| 4,771,803 A | * | 9/1988 | Berchem et al. | 137/375 |

(Continued)

FOREIGN PATENT DOCUMENTS

DE    1804604 A1    5/1970

(Continued)

*Primary Examiner*—John Bastianelli
(74) *Attorney, Agent, or Firm*—Thaddius J. Carvis

(57) ABSTRACT

A two-way ball valve (10) for liquid and/or gas flowing media, essentially comprises a valve fitting (12) made up of two connected housing parts (22, 28), in which a ball (18) with a drilling (20) for the media flow and an operating shaft (68) running perpendicular to the drilling (20) is mounted such as to be able to rotate. Furthermore, sealing shells (40, 42) are arranged to both sides of the ball (18) respectively, coaxial to the longitudinal axis (L) of the valve fitting (12), which enclose the ball (18) and completely fill the dead volume (38) between the valve fitting (12) and the ball (18). Said sealing half-shells (40, 42) have a front opening for the operating shaft (38) in the axial direction (L), corresponding to the cross section of the drilling (20) in the ball (18). The sealing half-shells (40, 42) only contact the ball (18) in the region of the front openings thereof, between which a narrow sickle-shaped annular gap is formed. In one embodiment a control diaphragm (58) is include on the inlet side of the flowing medium (16).

13 Claims, 2 Drawing Sheets

U.S. PATENT DOCUMENTS

| | | | |
|---|---|---|---|
| 4,815,704 A | 3/1989 | Berchem | |
| 5,031,876 A * | 7/1991 | Giacomini | 251/312 |
| 5,064,167 A * | 11/1991 | DiPalma | 251/214 |
| 5,857,622 A * | 1/1999 | Holt | 239/124 |
| 5,988,586 A * | 11/1999 | Boger | 251/127 |
| 6,276,397 B1 * | 8/2001 | Weber et al. | 138/37 |

FOREIGN PATENT DOCUMENTS

| | | | |
|---|---|---|---|
| DE | 7703253 | U1 | 9/1977 |
| DE | 7918227 | U1 | 10/1979 |
| DE | 8130294 | U1 | 2/1982 |
| DE | 1217157 | B | 5/1982 |
| DE | 3723542 | A1 | 1/1989 |
| DE | 10312801 | A1 | 9/2004 |

* cited by examiner

TWO-WAY BALL VALVE TO PREVENT BACKWASH

BACKGROUND OF THE INVENTION

The invention relates to a two-way ball valve for liquid and/or gaseous flowing media, with a valve fitting consisting of two interconnected housing parts and in which a ball with a bore for the media throughflow and with a drive shaft running perpendicularly with respect to the bore is mounted rotatably, and in which are arranged coaxially with respect to the longitudinal axis of the valve fitting, on both sides of the ball, sealing half shells which butt one against the other and which surround the ball and completely fill the dead space between the valve fitting and the ball, the sealing half shells having in the axial direction in each case an end-face orifice corresponding at least to the cross section of the bore of the ball, and having, on the annular surfaces butting one against the other, in each case a semicircular radial orifice for the drive shaft.

In industry and for the infrastructure of residential areas, media are transported in pipelines which are exposed to changing pressures and temperatures. To regulate the throughflow quantities, regulating members, in particular also ball valves, are used in the pipelines, in order to ensure optimal operating conditions and environmental protection.

DE 7703253 U1 already discloses a ball valve capable of being used as a shut-off and regulating member for liquid and gaseous flowing media and having as a closing piece a rotatable and bored-through ball arranged in a housing. The bore in the ball, as a function of its relative rotary position in the housing, can selectively be aligned with the inlet or the outlet orifice of the housing, or be set out of alignment with it. Further, the ball valve with a circularly delimited regulating disk is arranged fixedly with respect to the housing, directly in front of and/or behind the ball in the direction of flow, and is aligned with the inlet and/or the outlet of the housing and which has throttle orifices dimensioned correspondingly to the desired regulating characteristic.

It is known from U.S. Pat. No. 4,815,704 to use in a ball valve sealing rings or sealing shells which reduce the dead space in the form of an annular gap between the ball and valve fitting. This dead space is relatively large because the two sealing half shells are arranged at a considerable distance from one another. The backwash with the flowing media, although being reduced somewhat, is not prevented. Dead spaces in fittings of ball valves, in which part of the flowing medium may be trapped, always entail the risk that deposits of medium creep between the ball and valve housing, decay in the dead volume and contaminate the medium flowing through. Since the customary dead volumes are appreciable, this constitutes a potential risk which cannot be ignored.

According to DE 7918227 U1, a ball with a housing having a through bore and with a rotatable shut-off ball is configured in such a way that it is possible for the shut-off ball to be mounted so as to be completely free of any dead space. This dead space is filled in each case by a shell-like sealing ring consisting of sealing material. The sealing rings butt on the circumference one against the other on the end face.

BRIEF SUMMARY OF THE INVENTION

The object on which the present invention is based, therefore, is to provide a two-way ball valve of the type initially mentioned, in which the disadvantages of backwash with flowing medium are eliminated. Furthermore, the ball valve is to be capable of being used more effectively for different pressure and temperature ranges and is to be more wear-resistant.

The object is achieved, according to the invention, in that two sealing half shells butting one against the other surround the ball and completely fill the dead space between the valve fitting and the ball, the sealing half shells having in the axial direction in each case an end-face orifice which corresponds to the cross section of the bore of the ball, and having, on the annular surfaces butting one against the other, in each case a semicircular radial orifice for the drive shaft. Special and developing embodiments of the ball valve are the subject matter of the dependent patent claims.

The sealing half shells butting one against the other according to the invention, also called merely half shells, are preferably compressed by a force acting on them in the axial direction. The sealing action in the butting region of the two sealing half shells may be further improved in that the butting surfaces are designed in the form of a cone frustum, and/or in each case an annular groove is cut out on the end face in the peripheral region of the two sealing shells and a relatively highly projecting O-ring is inserted. When the two housing parts are screwed together, the O-rings are pressed onto annular surfaces of the valve fitting which project in step form and are pressed flat. The force exerted presses the sealing half shells together from both sides and makes these extremely leaktight in the butting region.

Geometric shapes other than the shape of a cone frustum may, of course, be formed with the same or a comparable action in the butting region.

According to a particularly advantageous development of the invention, the sealing half shells lie sealingly on the ball in only a narrow region of their end-face orifices, for example over a width of 1-2 mm. Between these two sealing annular bearing surfaces, the sealing half shells are at a short distance from the ball, preferably of at most about 0.5 mm, in particular at most about 0.2 mm. In this case, admittedly, a very small dead space is formed, because, for example, the water may gradually creep through via the sealing surfaces located on both sides. However, the volume is so small that contaminations of the medium flowing through which lie above a predetermined limit value are ruled out. Particularly in the case of liquid media, this narrow gap also has a positive action, a lubricating film which makes it easier to rotate the ball being formed.

The transition from the annular sealing region to the extremely narrow interspace for a lubricating film between the sealing half shells and the ball may take place continuously at a distance increasing slowly and diminishing again, or in steps.

Each of the two sealing half shells may be of two-part design. According to this solution, a radial parting plane runs in the region of the transition from the sealing surface to the lubricating film, the two parts of the sealing half shells being braced one against the other so as to seal the compressed O-rings. The advantage of this solution is that, when a seal is used up, the entire ball half shells do not have to be exchanged, but merely the part sealing off with respect to the ball. This may be a considerable advantage particularly in the case of ball half shells consisting of costly material.

According to a variant, the object is achieved, according to the invention, in that a regulating diaphragm is installed on the inflow and/or the outflow side of the flowing medium.

A ball valve with a regulating diaphragm can be used more effectively for different pressure and temperature ranges. The wear of the sealing half shells for the ball, such wear having an adverse effect on sealability in course of time, can be compensated more effectively if a regulating diaphragm of a type known per se, which also acts as a throttle device is inserted on the inflow side. The regulating diaphragm preferably comprises a Seeger ring.

For producing the sealing half shells, a slideable abrasion-resistant and mechanically stable material is preferred, corrosion resistance also being necessary, of course, in the case of the throughflow of a corrosive medium. Materials of this type are, for example, moldings consisting of polytetrafluoroethylene, usually called Teflon in brief, or moldings consisting of a stable material coated with polytetrafluoroethylene, of a polyamide or of a self-lubricating metal alloy. In the case of sealing half shells formed in two parts, the part sealing with respect to the ball may also consist, for example, of carbon graphite, and the inner part filling the dead space may consist of polytetrafluoroethylene.

The invention is explained in more detail by means of exemplary embodiments which are described in the drawing and are also the subject matter of dependent patent claims. In the diagrammatic drawing:

DETAILED DESCRIPTION OF THE INVENTION

Figure 1:
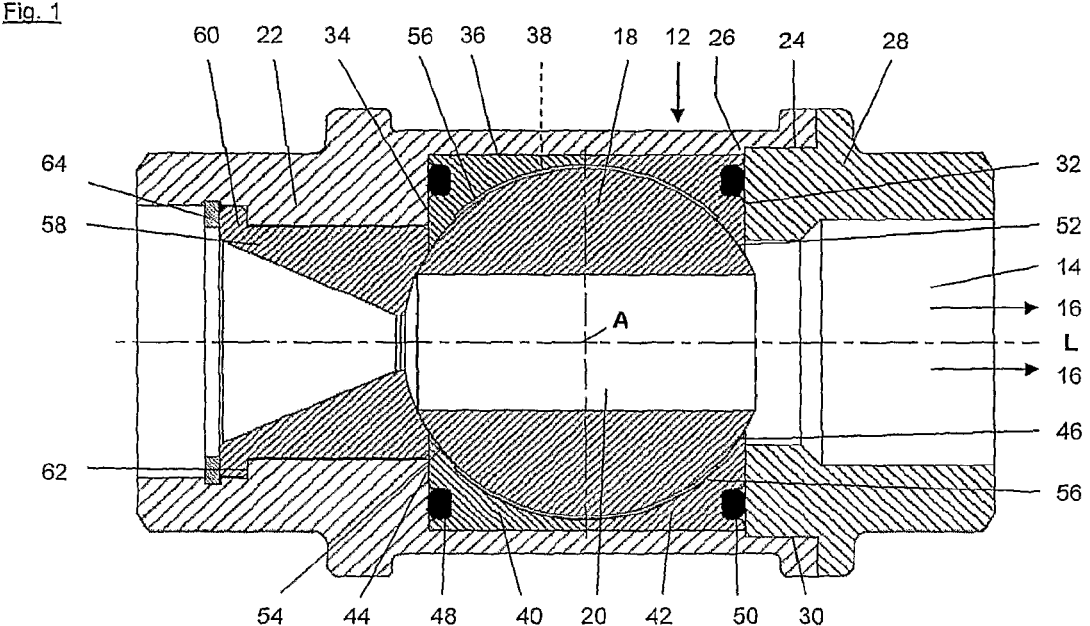
FIG. 1 shows an axial section through a completely open ball valve.

FIG. 1 shows a ball valve 10 which has essentially a valve fitting 12 with a throughflow duct 14 for a medium 16, illustrated by arrows, and with a ball 18 having a bore 20 open on both sides. This ball 18 may be rotated by means illustrated in FIG. 4 about an axis A running perpendicularly with respect to the drawing plane and with respect to the longitudinal axis L of the valve fitting 12. The bore 20 is completely open in the outflow orifice.

The valve fitting 12 comprises a first solid housing part 22 with a plurality of steps and with an end-face internal thread 24 which is formed in the region of the largest orifice and which is delimited by a step-shaped abutment 26. A second housing part 28 with an end-face external thread 30 is screwed in as far as the abutment 26. An end face 32 of wide form of the second housing part 28, a step 34 of the first housing part 32 and the inner surface area 36 form with the ball 18 a dead space 38 in the form of an annular gap which is completely filled by two sealing half shells 40, 42. The two housing parts 22, 28 are connected to one another releasably or by means of adhesive. These have on their end face 44, 46, in the peripheral region, an annular groove in which an O-ring 48, 50 is arranged. The screwed-in second housing part 28 compresses the projecting O-rings 48, 50 and not only gives rise to a seal, but also presses together sealingly the two butting-together surfaces of the two sealing half shells 40, 42. These two surfaces may not only be designed to be flat, but also in the form of a cone envelope and/or in stepped form.

In the present case, the sealing half shells 40, 42 lie directly on the ball 18 in the region of the end faces 44, 46 only and thus form relatively narrow sealing regions 52, 54. Between these sealing regions 52, 54, a very narrow annular gap 56 of sickle-shaped cross section is formed, which is illustrated by a thick line for the sake of simplicity. This annular gap 56 is gradually filled by capillary action with the medium 16 flowing through and, in the case of a liquid medium, forms a lubricating film which lowers the torques necessary for rotating the ball about the axis A. The sealing function is consequently not impaired.

On the inflow side of the ball valve 10, an exchangeable regulating diaphragm 58 known per se is inserted exchangeably into the throughflow duct 14 and lies on the ball 18. According to a variant, not illustrated, one or a further regulating diaphragm may be arranged separately or additionally on the outflow side. A collar 60 of the regulating diaphragm 58 lies on a step 62 of the first housing part 22 and is held by means of a Seeger ring 64. The regulating diaphragm 58 makes it possible to reduce the throughflow when the ball valve 10 is in the open position.

Figure 2:
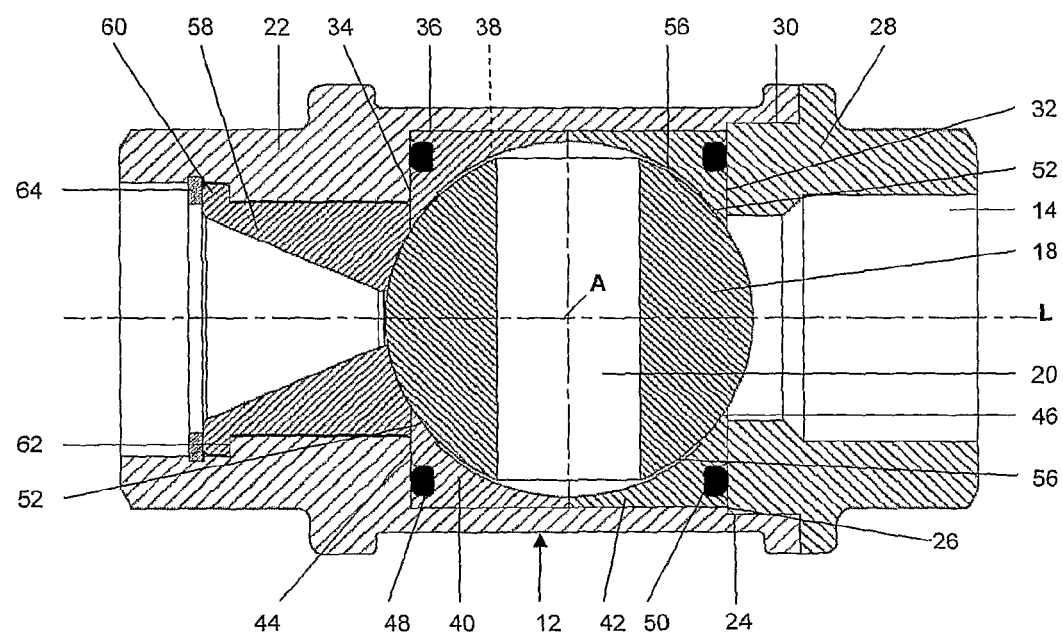
FIG. 2 shows a completely closed ball valve according to FIG. 1.

In FIG. 2, the ball valve is completely closed, and the ball is rotated through 90° about the axis A in relation to FIG. 1.

Figure 3:
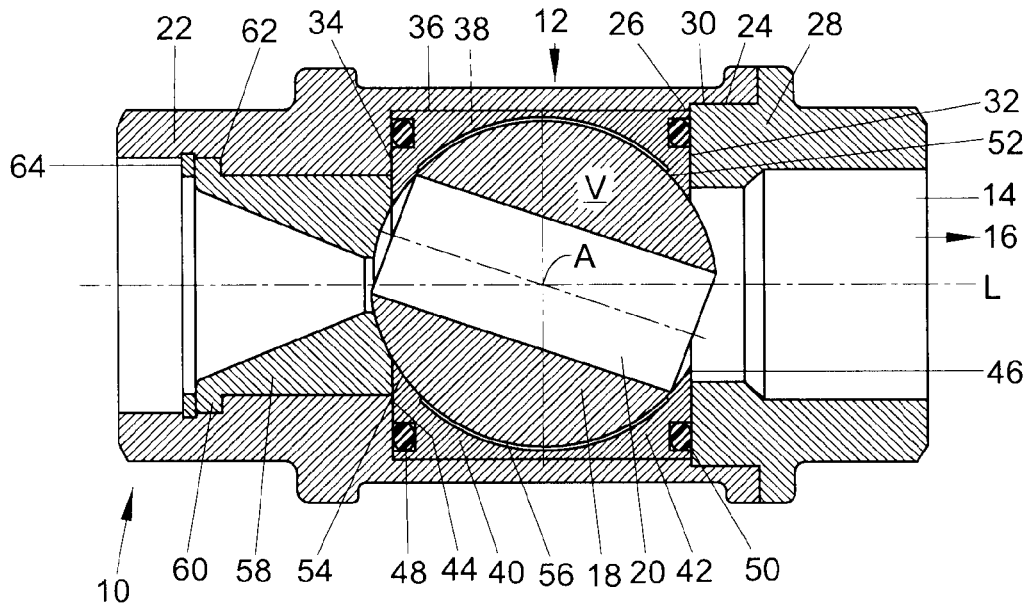
FIG. 3 shows a partially open ball valve according to FIG. 1.

The ball valve, partially open according to FIG. 3, reduces the throughflow quantity of the medium 16 adjustably, in combination with the regulating diaphragm 58.

In all the positions of the ball according to FIG. 1 to 3, a backwash of a dead space 38 is impossible, because this is filled completely by the two sealing half shells 40, 42. The volume of the sickle-shaped annular gap 56 is so small that no measurable contamination of the medium 16 flowing through can be detected even when the medium 16 is gradually diffused in. In the case of a liquid medium 16, the formation of a lubricating film has an advantageous effect.

Figure 4:
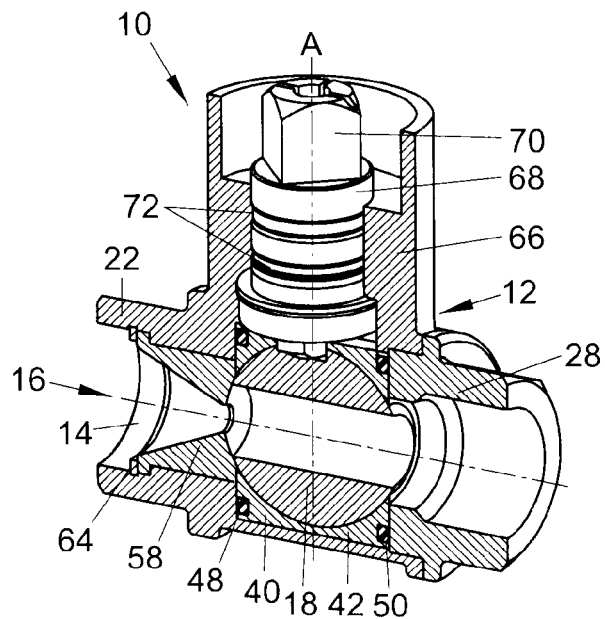
FIG. 4 shows a partially cutaway perspective illustration of an open ball valve.

The cutaway perspective view according to FIG. 4 corresponds essentially to FIG. 1. In the region of the ball 18, however, the first solid housing part 22 has a lateral guide connection piece 66 which has a drive shaft 68 for rotating the ball 18 about the axis A (see also FIG. 1 to 3). In the uppermost region, the drive shaft 68, which is in positive engagement with the ball 18, is designed as a square 70, as a rule for an electric plug-on motor, not illustrated, but also for a manually actuable lever. The drive shaft 68, designed with a round cross section in the region of the guide connection piece 66, has two sealing O-rings 72. According to a variant, not illustrated, sealing may take place by means of adjustable Teflon sleeves.

Figure 5:
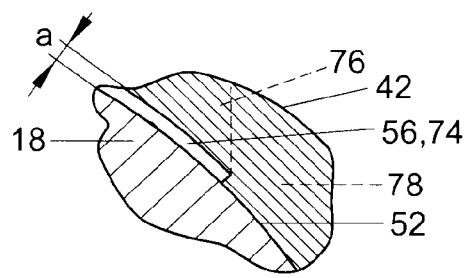
FIG. 5 shows a transition, illustrated enlarged, of a two-part sealing half shell.

FIG. 5 shows the enlarged region V of FIG. 3. The transition from the sealing region 52 to the sickle-shaped annular gap 56 is step-shaped in the present case, but may also be continuous. As a result of the capillary effect, for example, water diffuses through the sealing region 52 and forms a lubricating film 74 which in the present case has a thickness a of 0.1 mm which corresponds to the distance of the sealing half shells 42 from the ball. According to a variant depicted by dashes, the sealing half shell 42 may be of two-part design, an inner part 76 being seated firmly and filling the much larger part of the dead space 38, and the outer part 78 being exchangeable.

The invention claimed is:

1. A two-way ball valve (10) for liquid and/or gaseous flowing media, with a valve fitting (12) consisting of two interconnected housing parts (22, 28) in which a ball (18) with a bore (20) for the media throughflow and with a drive shaft (68) running perpendicularly with respect to the bore (20) is mounted rotatably, and in which are arranged coaxially with respect to the longitudinal axis (L) of the valve fitting (12), on both sides of the ball (18), sealing half shells (40, 42) which butt one against the other and which surround the ball (18) and completely fill a dead space (38) between the valve fitting (12) and the ball (18), the sealing half shells (40, 42) having in the axial direction (L) in each case an end-face orifice corresponding at least to the cross section of the bore (20) of the ball (18), and having, on the annular surfaces butting one against the other, in each case a semicircular radial orifice for the drive shaft (68), characterized in that the sealing half shells (40, 42) lie on the ball (18) in the region of their end-face orifices only and are at a short distance (a) from one another so as to form a narrow sickle-shaped annular gap (56).

2. The ball valve (10) as claimed in claim 1, characterized in that the annular gap (56) of the sealing half shells (40, 42) is at a distance (a) from the ball (18) of at most about 0.5 mm.

3. The ball valve (10) as claimed in claim 1 or 2, characterized in that the distance (a) of the sealing half shells (40, 42) from the ball (18) increases continuously and then decreases again.

4. The ball valve (10) as claimed in claim 1 or 2, characterized in that the transition to the distance (a) of the sealing half shells (40, 42) from the ball (18) is designed in step form.

5. The ball valve (10) as claimed in claim 1 or 2, characterized in that the sealing half shells (40, 42) lie on the ball (18) in a region with a width of 1 to 2 mm.

6. The ball valve (10) as claimed in claim 1 or 2, characterized in that the two sealing half shells (40, 42) are designed in two parts.

7. The ball valve (10) as claimed in claim 1, characterized in that the regulating diaphragm (58) comprises a Seeger ring (64).

8. The ball valve (10) as claimed in claim 7, characterized in that the sealing half shells (40, 42) lie on the ball (18) in the region of their end-face orifices only and are at a short distance (a) from one another so as to form a narrow sickle-shaped annular gap (56).

9. The ball valve (10) as claimed in claim 1 or 2, characterized in that, in the peripheral region of the end faces (44, 46) of the sealing half shells (40, 42), a projecting O-ring (48, 50) is inserted into a corresponding annular groove.

10. The ball valve (10) as claimed in claim 1 or 2, characterized in that the one-part sealing half shells (40, 42) consist of polytetrafluoroethylene, of a mechanically stable material coated with polytetrafluoroethylene, of a polyamide or of a self-lubricating metal alloy, and an outer part (78), sealing with respect to the ball (18), of the sealing half shell (40, 42), and an inner part (46) filling the dead space (38).

11. The ball valve (10) as claimed in claim 1 or 2, characterized in that the one-part sealing half shells (40, 42) consist of polytetrafluoroethylene, of a mechanically stable material coated with polytetrafluoroethylene, of a polyamide or of a self-lubricating metal alloy, and an outer part, sealing with respect to the ball (18), of the sealing half shell (40, 42) consists of carbon graphite, and an inner part (46) filling the dead space (38) consists of polytetrafluoroethylene or of sintered polytetrafluoroethylene.

12. The ball valve (10) as claimed in claim 2, characterized in that the annular gap (56) of the sealing half shells (40, 42) is at a distance (a) from the ball (18) of at most about 0.2 mm.

13. The ball valve (10) as claimed in claim 1 or 2, characterized in that the two sealing half shells (40, 42) are designed in two parts, with a radial parting plane between the sealing region (52, 54) and the sickle-shaped annular gap (56).

* * * * *